Figure 5:
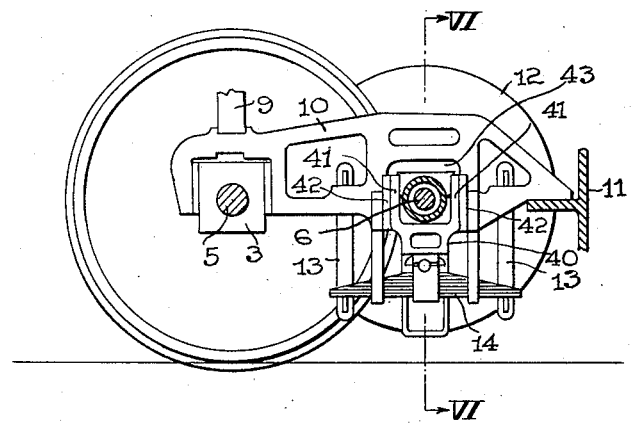

Jan. 1, 1929.
G. M. EATON
1,697,169
RAILWAY MOTOR MOUNTING
Filed Oct. 24, 1923   2 Sheets-Sheet 1
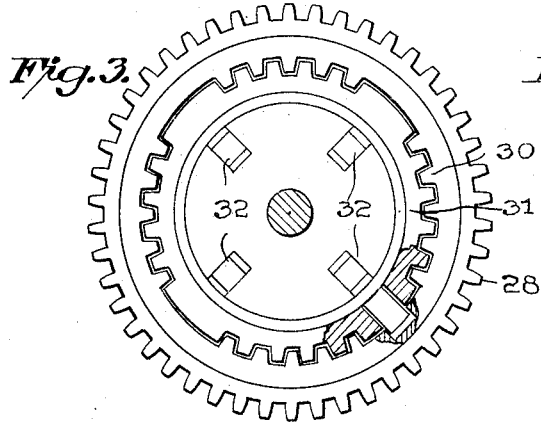
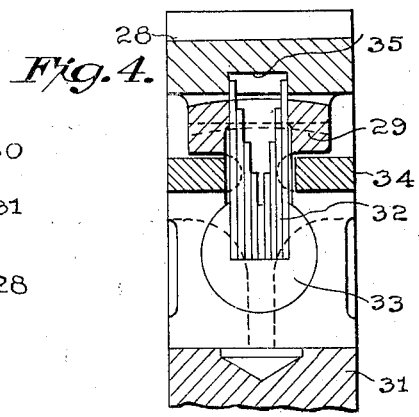
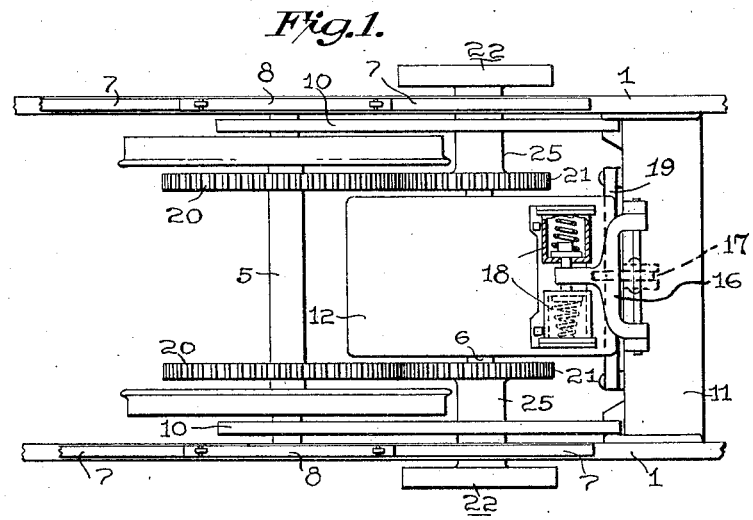
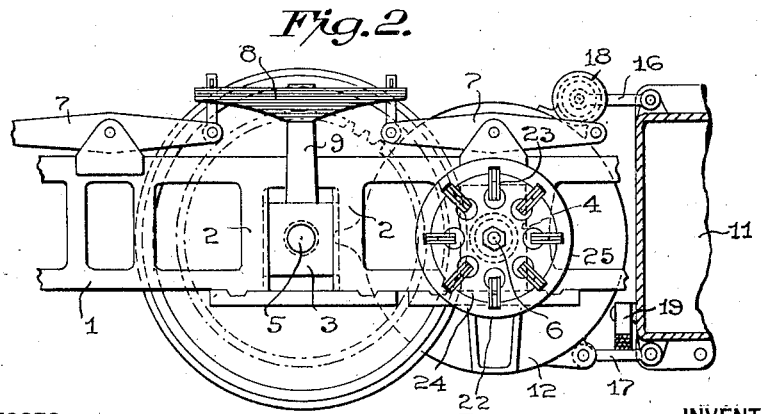
WITNESSES:
INVENTOR
George M. Eaton
BY
ATTORNEY Jan. 1, 1929.

G. M. EATON 1,697,169

RAILWAY MOTOR MOUNTING

Filed Oct. 24, 1923    2 Sheets-Sheet 2

WITNESSES:
R. S. Harrison
M. B. Jaspert

INVENTOR
George M. Eaton
BY
Wesley G. Carr
ATTORNEY

Patented Jan. 1, 1929.

1,697,169

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

RAILWAY-MOTOR MOUNTING.

Application filed October 24, 1923. Serial No. 670,509.

My invention relates to electrical railway vehicles, more especially to driving mechanisms therefor, of the type embodying a geared motor drive and permitting movement of the driving motor relative to the drive axles and the supporting frames.

It is among the objects of my invention to provide a geared motor drive for electrical railway vehicles which is of simple, compact, mechanical structure, which is durable and efficient in its operation and performance and which is of flexible mechanical function in that it permits of relative movements of the motor shaft and wheel axles without affecting the alignment of the associated gear-wheels.

It is a further object of this invention to provide a motor mounting which is connected by suitable gear trains to the driving axles and which shall maintain a fixed center distance of the gear elements regardless of the angular displacement of the drive axle and the motor shaft.

It is still a further object of my invention to provide a vehicle drive of the above-designated character which shall be readily accessible for the renewal of the operating mechanism and also for the renewal of the operating mechanism and also for the removal of the motor and the driving wheels by dropping them separately into the work pits without requiring rotation of the wheels or the motor.

Geared motor drives, as heretofore employed, necessitated the use of motor axle bearings to provide rigid center distances for the meshing gear-wheel and pinion. However, such a rigid construction was detrimental to the motor and other operating parts by reason of excessive strains and impact imparted by the vertical and transverse irregularities of the rails.

My present invention is directed to a motor drive mechanism that maintains fixed gear-center distances, but is otherwise flexible and yielding to the forces exerted thereon. This result is accomplished by suspending the motor in the frame in such manner as to permit of resilient vertical movement and yielding lateral restraint.

The flexible mounting of the motor is made possible by utilizing a flexible gear element which is so constructed as to permit of angular displacement of the hub member relative to the working rim, so as to insure a constant and perfect mesh of the co-operating gear-wheels while permitting misalinement of the drive axle and motor shaft.

Figure 6:
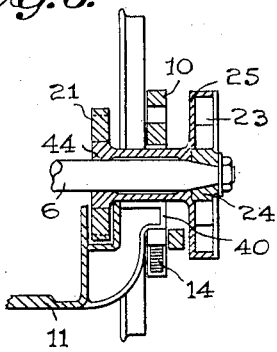

In the accompanying drawing constituting a part hereof and in which like reference characters designate like parts, Fig. 1 is a plan view of a drive mechanism embodying the principles of my invention, Fig. 2 is a side elevational view thereof, partially in cross-section, Fig. 3 is an elevational view, partially in cross-section, of the gear element utilized in the drive shown in Fig. 1 and Fig. 2, Fig. 4 is a cross-sectional view, partially in elevation, of the gear element of Fig. 3, Fig. 5 is a side elevational view illustrating the motor suspension on the frame and journal boxes, and Fig. 6 is a cross-sectional and elevational view taken along the line VI—VI, Fig. 5.

Referring to Figs. 1 and 2, the illustrated drive mechanism comprises the usual side frames 1, which are provided with vertical pedstal jaws 2 adapted to receive journal boxes 3 to journal a wheeled axle 5. Openings 4 are provided in the frames 1 for mounting a motor 12, which is suspended independently of the side frames.

The vehicle body (not shown) may be supported on the axle 5 in the usual manner through an equalizer mechanism embodying a plurality of equalizing beams 7 that are pivoted on the frames 1 and suitably associated with a laminated spring 8, the spring 8 being mounted on saddles 9, which are supported on the journal boxes 3 of the drive axles.

A plurality of longitudinal beams 10, Fig. 5, are supported on a bolster 11 at one end and on the journal boxes 3 at the other. A plurality of vertical links 13 are pivoted to the beams 10 to support, near their lower ends, semi-elliptic springs 14. The motor 12 is suspended from the beams 10 by mounting a plurality of motor brackets 40 on the respective springs 14 (Figs. 5 and 6), to provide a complete vertical spring support. The brackets 40 are provided with vertical pedestals 41, which co-operate with wearing shoes 42, that are secured in the openings 43 of the beams 10.

The frame of the motor 12 is further provided with a plurality of torque rods 16 and 17, respectively located near the top and the bottom of the motor, the former having a resilient connection with the motor comprising a plurality of coil springs 18, to permit of lateral movement of the motor stator relative to the bolster 11. The torque rods are pivoted to the bolster to permit of vertical movement of the motor frame. A semi-elliptical spring 19 is interposed between the torque rod 17 and the frame 1 to prevent the motor from riding on its gears.

The motor shaft 6 and the drive axle 5 are connected by a pair of gear-wheels 20 that are located near opposite ends of the wheel axle 5 and a pair of pinions 21 that are correspondingly located on the motor shaft 6. The motor shaft is further provided with a pair of flexible elements 22, which are located beyond the side frames 1 and embody a plurality of symmetrically disposed radial spring nests 23 that are secured in flanged hubs 24 to co-operatively engage sleeve members 25 upon which the pinion members 21 are mounted. The sleeves have a bearing fit 44 with the motor shaft 6.

The gear-wheels 20 severally comprise a structure as illustrated in Figs. 3 and 4, each embodying a toothed working rim 28, which is shrunk on the outside of a modified internal gear or female spline member that is provided with a spherically-curved inner face 29 having internal gear teeth 30, which are adapted to engage co-operating teeth of a hub member 31. A plurality of spring nests 32 each having a cylindrical base 33, are secured in a split portion of the hub 31, which is held in place by shrink rings 34, while the projecting outer spring leaves of the spring nests 32 are disposed in recesses 35 that are provided in the gear rim 28.

The object of this construction is to permit universal movement of the hub member 31 on its spherical seat 29, which movement is laterally restrained by the spring nests 32 and is limited in an angular or rotative direction by the internal teeth 30 through which the driving torque is transmitted.

The function of the gear-wheels 20 is to permit of angular displacement of wheel axle 5 and motor shaft 6 relative to each other or to the vehicle frames without affecting the tooth engagement of the pinion members 21. The gear-center distance is maintained under all operating conditions by means of the horizontal beams 10, whereby constant engagement of the co-operating gear-wheels is insured. The design of the vertical supporting springs 14 of the motor and the lateral restraining springs 18 is such as to permit limited movement of the motor relative to the frame that is sufficient to relieve the stresses acting thereupon, thereby protecting the apparatus from sudden shock, impact and twisting strains.

The torque rods 16 and 17 function to resist the field reaction of the motor 12, and the climbing tendency of the gear-wheels that is caused by the torque of the motor is counteracted by the semi-elliptical spring 19.

It is obvious from the description of my invention that a motor drive constructed in accordance therewith provides a novel and efficient driving element which obviates, to a great extent, the difficulties encountered in railway vehicle operation and that the association of parts and the design of the mechanical members are such as to produce but little movement, resulting in durability and lasting performance.

Although I have described a specific embodiment of my invention, it will be obvious to those skilled in the art, that various modifications may be made in the details of construction, such as the type of flexible element employed on the motor shaft, and the proportion and relation of the various co-operating parts, without departing from the principles herein set forth.

I claim as my invention:—

1. The combination with a wheel axle, of a driving motor, a plurality of gear-wheels on said axle having spherically curved seating hubs, and a plurality of co-operating pinion members on the shaft of said motor having flexible elements associated therewith, said motor being provided with resilient vertical and lateral restraining means.

2. A railway vehicle drive comprising a plurality of horizontal beams supported near the respective ends of a wheel axle, a spring-borne motor suspended from said beams, a plurality of gear-wheels connecting the motor shaft and wheel axle, flexible elements associated with said gear-wheels, means permitting angular displacement of the motor shaft relative to the wheel axle, and yielding lateral restraining means for said motor comprising a plurality of coil springs connecting said motor to the vehicle truck frame.

3. A railway vehicle drive comprising a plurality of horizontal beams supported near the respective ends of a wheel axle, a spring-borne motor suspended from said beams, a plurality of gear-wheels connecting the motor shaft and wheel axle, torque rods for resisting the field reaction of said motor, flexible elements associated with said gear-wheels, means permitting angular displacement of the motor shaft relative to the wheel axle, and yielding lateral restraining means for said motor comprising a plurality of coil springs connecting said motor to the vehicle truck frame.

4. A flexible drive mechanism comprising a gear-wheel having tangential flexibility and a co-operating gear-wheel having a spherically curved hub portion and resilient lateral restraining means.

5. The combination with a tangentially flexible gear element, of a co-operating gear-wheel having a spherically curved hub connection and resilient lateral restraining means.

6. The combination with a wheel axle of a driving motor, a gear-wheel on the axle having a spherically curved seating hub and resilient lateral restraining means, and a cooperating pinion on the motor having a flexible element, associated therewith.

7. A railway vehicle drive comprising a wheel axle, a plurality of horizontal beams supported near the respective ends of the wheel axle, a spring-borne motor suspended from the beams, means for transmitting power from the motor to the wheel axle, means permitting angular displacement of the motor relative to the wheel axle, and yielding means for restraining said motor from lateral movement.

8. In a railway vehicle, a supporting frame, a wheel axle resiliently mounted in the supporting frame, a motor for driving the wheel axle, resilient means for supporting the motor in the frame, means for yieldingly restraining lateral movement of the motor, means for resiliently opposing the torque reaction of the motor and means for transmitting power from the motor to the whel axle.

9. A railway vehicle drive mechanism comprising a motor associated with a wheel axle and a gear train for connecting the motor to the axle, one of the gear-wheels of the train comprising a hub portion having a spherically-curved seat at its outer periphery, a toothed rim portion having a complementary spherically-curved inner surface mounted on the hub and resilient means for restraining lateral displacement of the rim portion relative to the hub portion.

In testimony whereof, I have hereunto subscribed my name this 20th day of October, 1923.

GEORGE M. EATON.